United States Patent [19]

Masino et al.

[11] 3,716,913
[45] Feb. 20, 1973

[54] METHOD OF AND APPARATUS FOR PREPARING COLD CRIMP SLEEVES

[75] Inventors: Carlo Masino; Paolo Gilardine, both of Turin, Italy

[73] Assignee: AMP Incorporated, Harrisburg, Pa.

[22] Filed: April 9, 1970

[21] Appl. No.: 31,439

Related U.S. Application Data

[62] Division of Ser. No. 794,881, Jan. 29, 1972, abandoned.

[52] U.S. Cl.................29/629, 29/203 D, 29/630 A, 29/433, 264/151, 264/163, 264/150
[51] Int. Cl.............................H02g 15/00, H01r 9/00
[58] Field of Search....29/628, 629, 630 A, 433, 203, 29/241; 264/23, 151, 148, 163, 150

[56] References Cited

UNITED STATES PATENTS

| | | | |
|---|---|---|---|
| 3,329,002 | 7/1967 | Schwalm | 29/203 DT |
| 3,436,006 | 4/1969 | Cole | 264/23 X |
| 3,506,411 | 4/1970 | Robins | 29/433 X |
| 3,537,167 | 11/1970 | Lawson | 29/203 |
| 3,562,904 | 2/1971 | Lan et al. | 18/5 E |

Primary Examiner—Charles W. Lanham
Assistant Examiner—Robert Ward Church
Attorney—Curtis, Morris and Safford, Marshall M. Holcombe, William Hintz, William J. Keating, Frederick W. Raring, John R. Hopkins, Adrian J. La Rue and Jay L. Seitchik

[57] ABSTRACT

A continuous length of cold crimp sleeve material is fed past a shear blade towards a stop. A perform die is disposed between the stop and the shear blade and is driven with the shear blade from a press ram. The preform die moves in a reverse direction to the shear blade and shearing and preforming are performed simultaneously. The preformed cut sleeve is transferred laterally to a crimping station where the dies are operated from the ram simultaneously with the shear blade and preform die. A further transfer device driven with the feeding device for the sleeve length transfers cut sleeve lengths from a first transfer part into the dies and presents a stop serving to position the leading end of a crimped termination within the cold crimp sleeve.

13 Claims, 10 Drawing Figures

PATENTED FEB 20 1973

INVENTOR
CARLO MASINO
PAOLO GILARDINO

BY Adrian J. LaRue

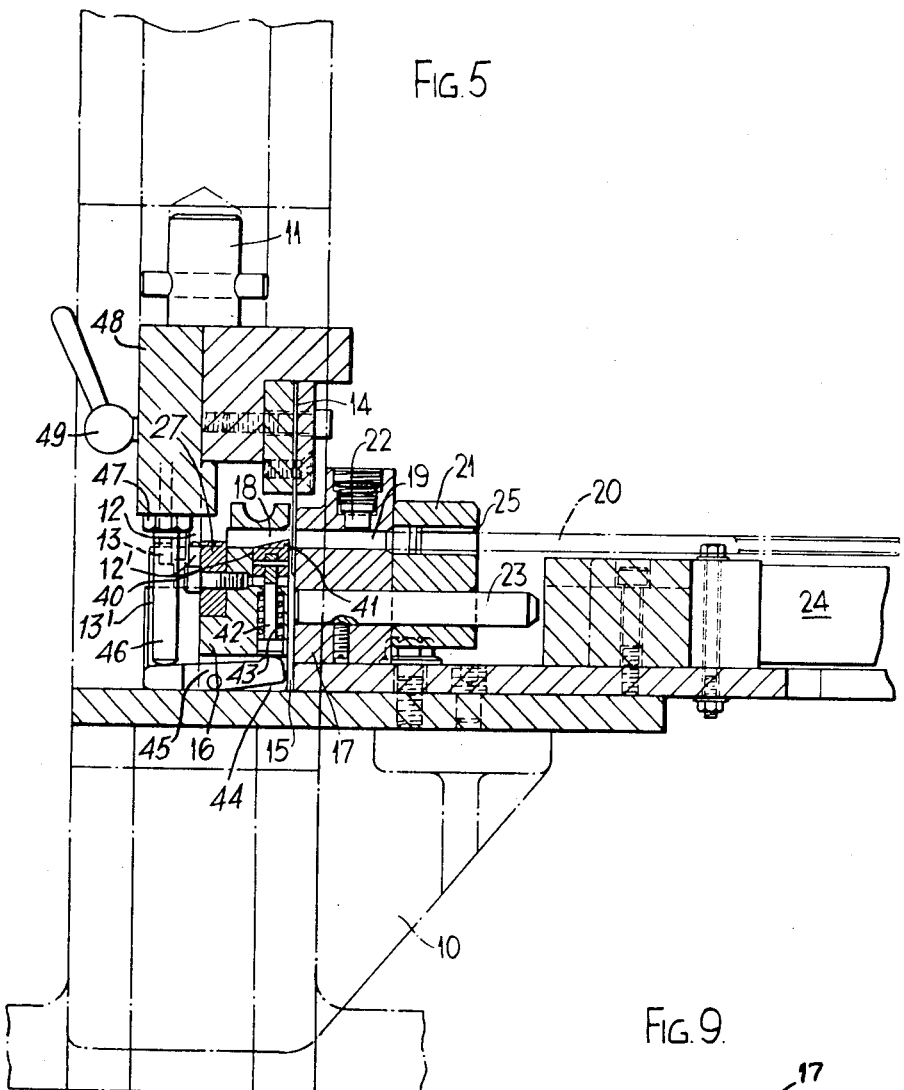
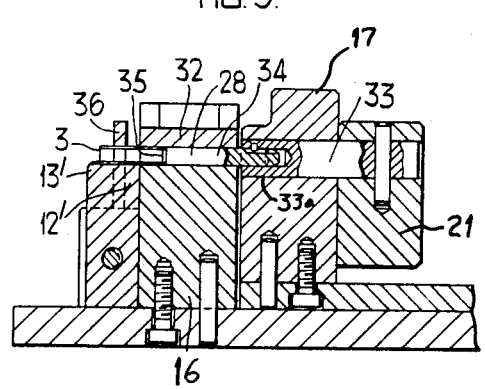

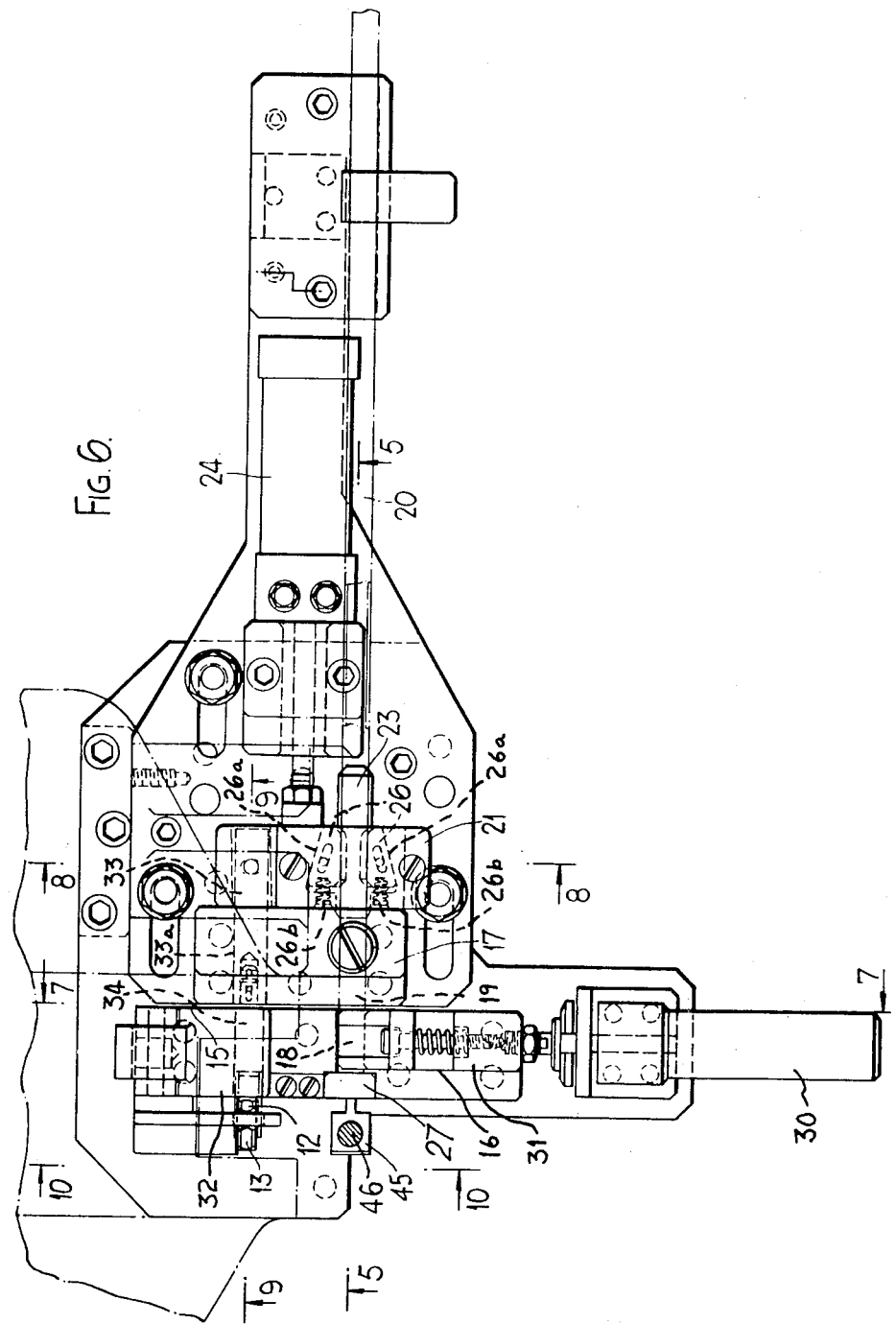

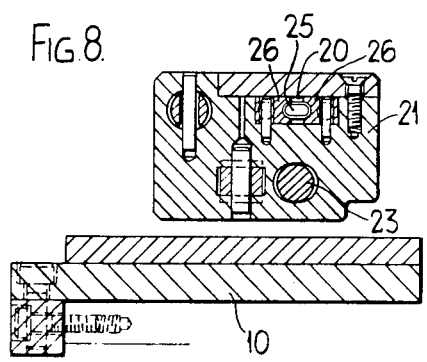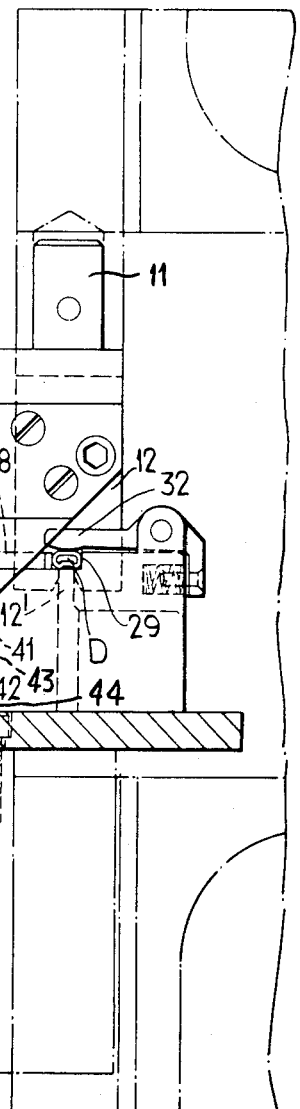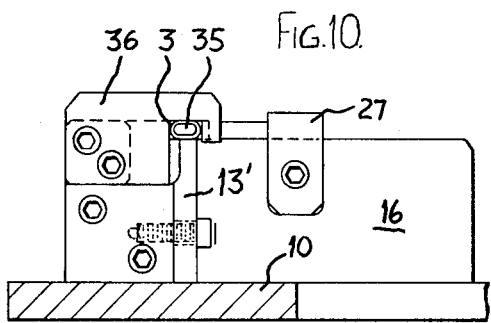

METHOD OF AND APPARATUS FOR PREPARING COLD CRIMP SLEEVES

CROSS REFERENCE TO RELATED APPLICATION

This application is a division of our earlier filed application Ser. No. 794,881, filed Jan. 29, 1972, now abandoned.

This invention relates to improved method and means for preparing preformed lengths of cold-crimp sleeve material from a continuous length for application to wire terminations by the cold-crimp sleeve technique.

This technique concerns the securing of a sleeve of insulation about a terminal at the end of a conductor wire by deforming the insulating sleeve in a cold state about the terminal. Suitable plastic insulating material for the purpose is generally hard relative to conventional insulating boots which are often used for similar purposes. It has previously been proposed to employ a machine to effect the cold-crimping operation, but difficulty has been experienced in feeding the sleeves to the crimping dies at a usefully fast rate. According to one method, short lengths of sleeves are cut from a sleeve length and then fed to the crimping device through a vibratory or bowl feed, but difficulty is experienced in ensuring precise orientation of the sleeve length with the dies and the connector terminal to be received unless a slow rate of operation is maintained.

In patent application Ser. No. 29,343, filed Apr. 8, 1970, there has been disclosed and claimed a method in which a continuous sleeve length is fed to a cutting and measuring station at which an end length of sleeve is cut from the continuous length, the end length is then transferred laterally from the cutting station into alignment with a crimping station, feeding means for the sleeve being operated to position a further length of sleeve in the cutting station and transfer the first cut length into the crimping station, operation of a ram for crimping the first length of sleeve about a wire termination effecting a cutting operation at the cutting station.

This application also disclosed and claimed a crimping machine for cold-crimping lengths of insulating sleeve about wire terminations by the cold crimp sleeve technique, in which a feed device is arranged for step-by-step feeding of a continuous length of cold-crimp sleeve material through a feed passageway, a slot extending transversely of the feed passageway for access of a cutting device for cutting the sleeve at the slot, a first transfer device being arranged for transferring a cut length of sleeve from the passageway laterally into alignment with a crimping device and a second transfer device being arranged to advance the cut length of sleeve axially to the crimping device, the second transfer device providing a wire termination stop for obturating the trailing end of the cut length at the crimping device.

The present invention includes a method of preparing cold-crimp sleeve lengths from a continuous length of insulating material for insulating a wire termination by the cold-crimp sleeve technique, in which the continuous length is fed to engage an end with a stop, an end length being severed from the continuous length at a predetermined distance from the stop, the cut length being preformed and the preformed cut length being transferred laterally from the cutting, measuring and preforming station.

In a particularly useful application the cut lengths are transferred laterally from the cutting, measuring and preforming station to a crimping station for cold-crimping of the cut sleeve lengths about wire terminations.

The invention also includes a machine for preparing cold-crimp sleeve lengths from a continuous length of insulating sleeve material for insulating wire terminations by the cold-crimp sleeve technique, in which a feed device is arranged for step-by-step feeding of a continuous length of cold-crimp sleeve material through a feed passageway, a slot extending transversely of the feed passageway for access of a cutting device for cutting the sleeve at the slot, a preforming die being disposed in the passageway at a side of the shear blade remote from the feed device, a first transfer device being arranged for transferring a cut length of sleeve laterally from the passageway.

Suitably the transfer device is arranged for transferring the cut length of preformed sleeve laterally from the passageway to a crimping device and, in a particular application, a second transfer device is arranged to advance cut lengths of sleeve axially from the first transfer device to the crimping device, the second transfer device providing a wire termination stop for obturating the trailing preformed end of the cut length at the crimping device.

An object of the invention is to provide a crimping machine for cold-crimping cut lengths of a sleeve having cold-crimping characteristics onto electrical terminals.

Another object of the invention is the provision of a crimping machine which cuts the sleeve to provide an insulating sleeve ready to be transferred to a position in alignment with crimping dies while an insulating sleeve is being crimped onto an electrical terminal.

An additional object is to provide preforming die means to preform the cut insulating sleeve during the cutting of the sleeve and prior to the insulating sleeve being transferred to the position in alignment with crimping dies.

A further object is to provide a crimping machine wherein a transfer device is used to transfer a cut length of sleeve into a crimping area whereat crimping dies cold-crimp the cut length of sleeve onto an electrical terminal.

A still additional object is the provision that the transfer device defines a stop whereby the electrical terminal is positioned properly within the cut length of sleeve so that proper insulation thereof is effected.

A still further object is to provide a method of cold-crimping an insulating sleeve onto an electrical terminal and the wire to which the electrical terminal is terminated.

Still an additional object is the provision of an electrical terminal terminated to an end of an electrical wire and an insulating sleeve cold-crimped thereonto to completely insulate the terminated end of the wire to provide an electrical connector assembly.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration and principles thereof and the manner of applying it in practical use so that they may modify in various forms, each as may be best suited to the conditions of a particular use.

The invention will now be described, by way of example, with reference to the accompanying partly diagrammatic drawings, in which:

FIG. 5 is a fragmentary, partly cross-sectional elevational view of a machine for effecting insulation of a wire termination by cold-crimping short lengths of insulating sleeve supplied to the machine as a continuous length, the section being taken on line 5—5 of FIG. 6;

FIG. 6 is a fragmentary plan view of the machine of FIG. 5;

FIG. 7 is a fragmentary, partly cross-sectional view of the machine taken on the line 7—7 of FIG. 6;

FIG. 8 is a fragmentary cross-sectional view taken on line 8—8 of FIG. 6;

FIG. 9 is a fragmentary cross-sectional view taken on line 9—9 of FIG. 6; and

FIG. 10 is a fragmentary cross-sectional view taken on line 10—10 of FIG. 6.

Figure 1:
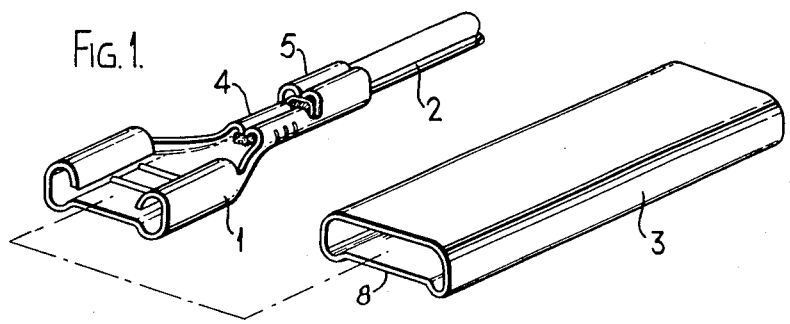
FIG. 1 is a perspective and exploded view of a typical wire termination and a preformed insulating sleeve for cold-crimping about the termination.
Figure 2:
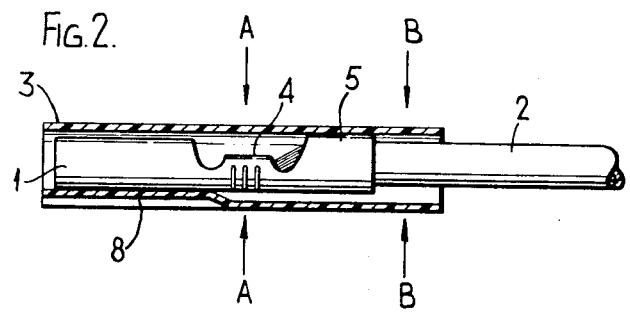
FIGS. 2 and 3 are cross-sectional views of the termination and sleeve of FIG. 1 being subjected to a cold-crimping operation.

In FIG. 1, an electrical connector tab receptacle 1 is shown crimped to an insulated wire 2 and disposed adjacent a length of preformed insulating sleeve 3 suitable for cold-crimping to the connector. The receptacle 1 is adapted at its forward end releasably to receive a tab in well-known manner to effect electrical connection. At its rear end, the receptacle has a wire-crimp section 4 and an insulation support section 5 which are secured respectively to the wire core and the insulation of an end portion of the insulated conductor wire 2, the wire crimp 4 being of smaller cross-sectional area than the insulation support section 5 and the forward receptacle portion. Such connectors are generally applied to wires in an automatic machine supplied with connectors in strip form resulting in wires terminated with connectors in the manner shown in FIG. 1. It is often desirable to extend the insulation of the conductor around the connector receptacle and for such purposes the connector receptacle is disposed within a sleeve of insulating material 3 within which, as shown in FIG. 2, it is a free sliding fit, the sleeve being longer than the connector. The terminated connector and sleeve 3 constitute an electrical connector assembly. Suitably, in the case of a receptacle of the kind shown, the sleeve is of oval or flattened cross-section approximating to the peripheral cross-sectional contour of the receptacle portion of the connector. It will be understood, however, that the insulating technique is equally applicable to other forms of connectors and such other forms as may require a sleeve of a different cross-sectional shape than the sleeve shown.

Figure 3:
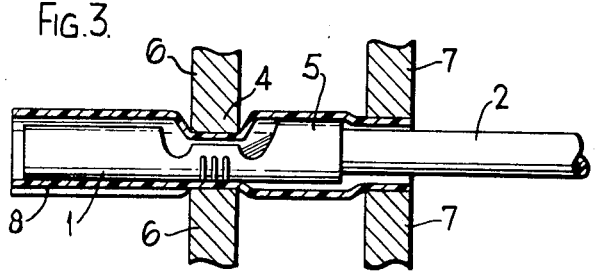

As shown in FIG. 2, the connector receptacle 1 is positioned with its forward end short of one end of the sleeve 3 and with the insulation support 5 spaced inwardly of the other end by a substantial distance so that a length of the insulated conductor 2 penetrates the sleeve 3. The sleeve 3 is then cold-crimped at zone A, around the wire crimp section 4 and zone B, rearwardly of the insulation support 5 and around the insulated conductor wire 2, as shown in FIG. 3, by suitable die sets 6 and 7. The dies compress and cold work the sleeve material to reduce the cross-sectional area of the sleeve at the zones A and B. At the zone A, the sleeve is reduced in cross-section to project into a recess between the receptacle portion and the insulation support section, and may be a relatively tight fit around the wire crimp section 4. At the zone B, the sleeve may be reduced to a lesser extent, loosely to embrace the wire insulation and shield the insulation support 5 from access.

The crimped zones A and B serve to secure the sleeve 3 to the receptacle 1 against inadvertent removal without constraining the proper functioning of the receptacle.

In use of insulated terminations of this kind, there has been a risk of a complementary tab terminal being improperly mated with the receptacle 1 by being inserted between the floor of the receptacle and the adjacent wall of the sleeve 3. To guard against this danger, which is very difficult to detect during assembly but becomes evident in use with the electrical connection between tab and receptacle becoming defective, the sleeve 3 is preformed at zone 8. The preformed portion of the sleeve 8 comprises an elevation or indentation of a sidewall part at the forward end of the sleeve to constrict the space between the floor of the receptacle 3 and the sleeve.

It is difficult to effect this deformation after the receptacle 3 is in position without risk of damage to the receptacle, since to obtain plastic deformation of the sleeve, the initial deformation has to go beyond the desired configuration or condition to compensate for relaxation or spring-back after the deforming action. To avoid this risk, it has been proposed to preform the sleeve before insertion of the terminal, but this has been practicable only in loose-piece or individual sleeves.

Figure 4:
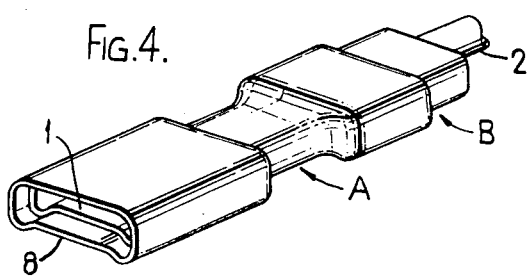
FIG. 4 is a perspective view of the insulated termination resulting from the operation of FIGS. 2 and 3.

The machine for preparing sleeves 3 of appropriate length from a continuous length of sleeve material, preforming the individual lengths, and applying individual lengths 3 about connectors comprises a machine frame 10 supporting a driving device, not shown, for a press ram 11 reciprocable vertically as seen in FIG. 5. The lower end of the ram 11 carries a pair of dies 12, 13 engageable with complementary dies 12', 13' mounted on the frame 10 for cold-crimping a sleeve about a connector in the manner described in connection with FIGS. 2 to 4. The ram 11 also carries a shear blade 14 remote from the dies 12 and 13 as seen in FIGS. 5 and 7 and reciprocable vertically with ram 11 in a slot 15 seen in FIGS. 5 and 6, and defined between blocks 16 and 17 secured to the frame 10. The blocks 16 and 17 are formed with respective aligned passageways 18, 19 of uniform cross-section for the passage of insulating sleeve 20 fed by a reciprocable feed block 21 disposed on a side of block 17 remote from slot 15. The passageways 18, 19 have a cross-section corresponding to the cross-sectional periphery of the sleeve material 20 and within which the sleeve is a sliding fit. A spring plunger 22 is arranged transversely of bore 19 to engage the sleeve on its upper side with sufficient force to allow feeding of the sleeve 21 towards block 16 under the force of the feed block 21 but to resist withdrawal of the sleeve or non-feeding movement of the block 21, to be described.

The feed block 21 is reciprocable on a guide bar 23 secured to block 17 and extending parallel to passageways 18, 19. The block 21 is driven by a piston and cylinder device 24 and is formed with a passageway 25 aligned with passageways 18, 19, and through which the sleeve material 20 is arranged to pass. As seen in FIGS. 6 and 8, two jaw members 26 are slidably disposed within passageway 25 in guideways 26a which converge in a direction away from block 17. The jaw members are biased down the guideways by springs 26b to clamp the sleeve 20 with light pressure. On withdrawal movement, to the right as seen in FIGS. 5 and 6, of block 21, friction of the jaw members 26 on the sleeve resists their movement so that the jaw members tend to diverge, being driven up the inclined guideways 26a and the sleeve being held by the spring clamp 22 of block 17, until the jaw members release the sleeve and move to the right with block 21. On reverse movement, the jaw members are driven together by wedge action of the guideways to clamp the sleeve tightly until the clamp 22 is overcome and the sleeve is fed into bore 18. The sleeve material 20 is supplied from a reel mounted on the frame 10 but not shown.

The passageways 18, 19, are, as seen in FIG. 5, disposed at the same level as the lower dies 12′, 13′, but the passageway 18 is disposed to one side of these dies, and between the dies and the shear blade 14. The passageway 18 is closed, at the end remote from block 17 by a stop member 27. As seen in FIG. 7, the passageway 18 communicates at one side with a slot 28 of equal height and of width equal to the length of passageway 18, i.e., the thickness of the block 16. The slot 28 extends towards the crimping dies 12, 12′ so that a length of sleeve can be moved laterally from passageway 18 through slot 28 into alignment with the dies 12, 12′ and 13, 13′.

The floor of passageway 18, adjacent the slot 15, is formed with an aperture 40 through which projects a preforming die 41 reciprocable vertically with a push rod 42 slidable in the block 16, as illustrated in FIGS. 5 and 7. A captive biasing spring 43 biases the push rod 42 and preforming die 41 downwards and the lower end of the push rod 42 is exposed in a cavity 44 of the block 16. A rocker arm 45 is pivotally mounted in the cavity 44, and has a driving end engaging the lower end of push rod 42 and its other end projecting sidewardly of block 16. A plunger 46 reciprocable with the ram 11 is arranged to engage the exposed end of the rocker arm 45 so that on downward movement of the ram 11 the rocker 45 is driven counterclockwise as seen in FIG. 5, to lift the push rod 42 and drive the preforming die 41 upwards into the passageway 18. The upper side of die 41 is inclined upwardly and rearwardly of the passageway 18 towards passageway 19.

The thrust rod 46 is adjustable in effective length by lock-nut 47 to adjust the driven stroke of the rocker 45 and push rod 42. The rod 46 is retained in a support block 48 secured to the ram 11 by a quick-release coupling 49 to permit its replacement in the event the preforming operation is to be changed or withdrawal if it is not required.

The slot 28 at its end remote from passageway 18 is closed by a stop shoulder 29. A piston and cylinder device 30 supported by the frame 10 has a ram driving a transfer head 31 aligned with and slidable in slot 28 for transferring the sleeve lengths from the passageway 18 to the stop 29 in alignment with the dies 12, 12′, 13, 13′. Adjacent the stop shoulder 29, the upper side of the slot 28 is open and a sprung arm 32 projects through the opening releasably to clamp the sleeve lengths in position pending their transfer to the dies.

A transfer plunger 33, as seen most clearly in FIG. 9, is provided for transferring lengths of sleeve from the end of slot 28 and beneath arm 32. The plunger 33 is secured to the reciprocable feed block 21 and extends slidably through a bore 33a in block 17 to terminate in an end portion 34 of reduced cross-section corresponding to the cross-sectional contour of the sleeve material. The end portion 34 at its tip is shouldered at 35 to present a short length insertable within the end of the sleeve material. On full forward feeding movement of block 21 to the position of FIG. 9, a length 3 of sleeve is transferred from the slot 28 to bridge the dies 12′, 13′ with part of the sleeve remaining beneath the hold-down arm 32. A further hold-down arm 36 is positioned between the dies 12′, 13′ to guide the sleeve length and hold it in correct orientation at the dies as shown in FIG. 10.

In operation, the continuous length of sleeve 20 is positioned with an end portion passing through the feed block 21 to penetrate the passageway 19 of block 17 and passageway 18 of block 16, the end of the sleeve 20 abutting the stop 27. To effect this positioning, the ram 11, with upper dies 12, 13 and shear blade 14, is elevated to free the slot 15 between passageways 18 and 19 for passage of the sleeve, the feed block 21 is in its forward position, as shown in FIG. 5, and the transfer head 31 is in its withdrawn position of FIG. 7. The ram 11 is lowered to the FIG. 5 position, the cutting edge of the shear blade 14 severing the sleeve 20 at the slot 15. Simultaneously, the plunger 46 is lowered with the ram 11 to engage the rocker arm 45 and drive the push rod 42 upwards against the biasing spring 43 so that the preforming die 41 is elevated into the passageway 18 and engages the lower right-hand side of the cut sleeve member and drives a middle portion in the width of the sleeve upwards in upwardly and rearwardly inclined manner. The die 41 is elevated to deform the sleeve beyond the condition of FIG. 2 so that on withdrawal of the die 41 and partial relaxation of the sleeve material, the sleeve member assumes the general form of FIGS. 1–4 and 7. The ram 11 is then elevated to withdraw the blade 14 from the slot, and the feed block 21 is withdrawn, to the right in FIG. 5, the jaw members releasing from the sleeve 20 which is held in the block 17 by clamp 22. Withdrawal of block 21 also effects withdrawal of plunger 34 from the slot 28 to free the slot for transfer of the sheared end length of sleeve 20. Elevation of ram 11 lifts the thrust rod 46 and frees the rocker arm 45 for clockwise rotation and the die member 41 is lowered by the action of the biasing spring 43 to free passageway 18 for a further sleeve feeding action.

The piston and cylinder device 30 is operated to drive the transfer head 31 to the right as seen in FIG. 7, to transfer the sheared and preformed length of sleeve through slot 28 from the broken line position C to the full-line position D, i.e., from the passageway 18 to a position aligned with the dies 12, 13 and the plunger 33, 34. The transfer head is then withdrawn to the FIG. 7 condition, the sleeve length being retained in position D by hold-down arm 32 and the piston and cylinder 24 operated to advance the feed block 21 to the FIG. 5 condition and feed a further length of sleeve into the passageway 18 until the end abuts the stop 27. The feed block 21 is suitably adapted to over-feed by a short length to ensure that the sleeve end abuts the shoulder 27 and causes a small amount of slip at the jaw members 26 to ensure constant lengths of sleeves being cut by the shear blade 14.

On feeding movement of block 21, the plunger 33, 34 is moved through block 17 to transfer the cut sleeve length to the position shown in FIG. 9 with an end of the cut length 3 overlying the die 13' and the other end being disposed beneath the hold-down arm 32, the sleeve bridging the die 12'.

A connector crimped to a wire is manually inserted into the exposed open end of sleeve 3 above die 13' to the position generally shown in FIG. 2. The shouldered tip 35 of plunger 33, 34 serves as a stop to position the leading end of the connector short of the end of the sleeve length 3, and with the leading end of the connector disposed in the preformed portion of the sleeve. At this condition the ram 11 is lowered to mate the dies 12, 13 with complementary dies 12', 13' and cold crimp the sleeve portion about the connector and wire generally as described in connection with FIG. 3. The shear blade 14 simultaneously severs the continuous sleeve length 20 at the slot 15, and the die is elevated to effect a further preform action, so that the machine is ready for a further cycle of operation in the manner described. On elevation of the ram to repeat this cycle, the connector with the sleeve length 3 is released from the dies 12, 13 for manual withdrawal.

While in the embodiment disclosed, the plunger 33, 34 at its shouldered tip 35 is arranged to act as a stop to position the leading end of the connector short of the end of sleeve length 3, the shouldered tip 35 may be altered to position the leading end at any desired position. For example, the tip of the plunger may be recessed to allow the leading end of the connector to project forwardly of the sleeve length or it may terminate flush with the end of the sleeve length to locate the leading end of the connector at that position.

While the preforming die described is adapted to preform a sleeve of oval section to constrict an end for receiving a tab receptacle contact portion of flat form, other preform shapes are possible to adapt other sleeve sections for use with other contact forms and preforming dies distributed around the sleeve cross-sectional profile may be employed.

It will, therefore, be appreciated that the aforementioned and other desirable objects have been achieved; however, it should be emphasized that the particular embodiment of the invention, which is shown and described herein is intended as merely illustrative and not as restrictive of the invention.

The invention is claimed in accordance with the following:

1. A method of preparing cold-crimp sleeve lengths from a continuous length of insulating material for insulating a wire termination by the cold-crimp sleeve technique, comprising feeding the continuous length of insulating material to engage an end with a stop at a cutting, measuring and preforming station, severing an end length from the continuous length of insulating material at a predetermined distance from the stop, preforming the cut length at the station, transferring the preformed cut length laterally from the station to a crimping station, and cold-crimping the cut length about a wire termination.

2. A method as claimed in claim 1, in which additional steps include operating feeding means for the sleeve to position an end of the continuous length against the stop at the cutting, measuring and preforming station and at the same time transferring a cut length of sleeve into the crimping station, inserting a wire termination into the cut length of sleeve at the crimping station, moving a ram to effect a cold-crimping operation at the crimping station, and performing a cutting operation and a preforming operation at the cutting, measuring and preforming station.

3. A method as claimed in claim 2, in which the preforming step is effected at an end of the cut length of sleeve remote from the stop, and at the crimping station a wire termination is inserted into the cut sleeve against a stop arranged to locate a leading end of the termination at a predetermined position longitudinally of the sleeve.

4. A method as claimed in claim 2 or in claim 4, in which the preforming includes driving a die in a reverse direction to a shear blade for cutting the sleeve.

5. A machine for preparing cold crimp sleeve lengths from a continuous length of insulating sleeve material for insulating wire terminations by the cold-crimp sleeve technique, comprising a feed device arranged for step-by-step feeding of a continuous length of cold-crimp sleeve material through a feed passageway in alignment therewith, a slot extending transversely of the feed passageway, a cutting device including a shear blade for movement within the slot for cutting the sleeve at the slot, a preforming die being disposed in the passageway at a side of the shear blade remote from the feed device, and transfer device being arranged for transferring a cut length of sleeve laterally from the passageway to a crimping device.

6. A machine as claimed in claim 5, in which another transfer device is provided to advance cut lengths of sleeve axially from the first-mentioned transfer device to the crimping device, the other transfer device providing a wire termination stop for obturating the trailing preformed end of the cut length at the crimping device.

7. A machine as claimed in any of claim 5, in which the preforming die is arranged to operate on the sleeve in a reverse direction to the shear blade.

8. A machine as claimed in claim 7, in which a ram is arranged to drive the shear blade in one direction and engages a rocker arm to drive the preforming die in a reverse direction.

9. A machine as claimed in claim 8, in which a reciprocable push rod biased to a withdrawn position supports the preforming die, the push rod at an end remote from the die engaging an end of the rocker arm, a thrust rod driven by the ram and being in driving alignment with the other end of the rocker arm.

10. A machine as claimed in claim 9, in which the thrust rod is adjustable in effective length.

11. A machine as claimed in claim 10, in which the thrust rod is removable.

12. A machine as claimed in claim 8, in which the ram is arranged simultaneously to operate crimping dies of the crimping device.

13. A machine as claimed in claim 5, in which the preforming die is disposed adjacent the shear blade and has a preforming surface inclined inwardly of the sleeve towards the shear blade.

* * * * *